July 6, 1954 E. D. PELLEGRIN 2,682,831
BROILER PAN AND ADJUSTABLE SUPPORT THEREFOR
Filed July 7, 1952 2 Sheets-Sheet 1
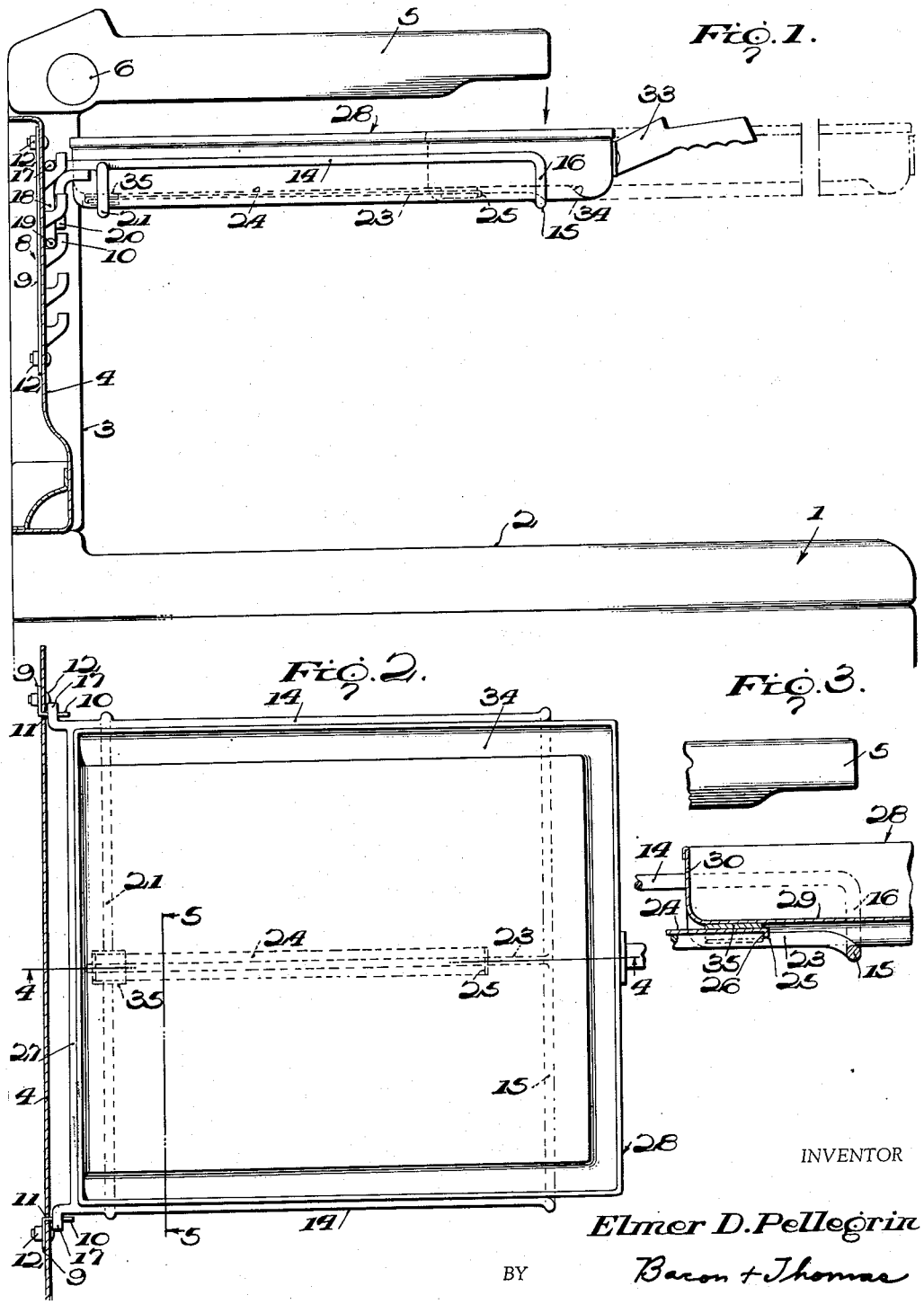
INVENTOR
Elmer D. Pellegrin
BY Bacon + Thomas
ATTORNEYS

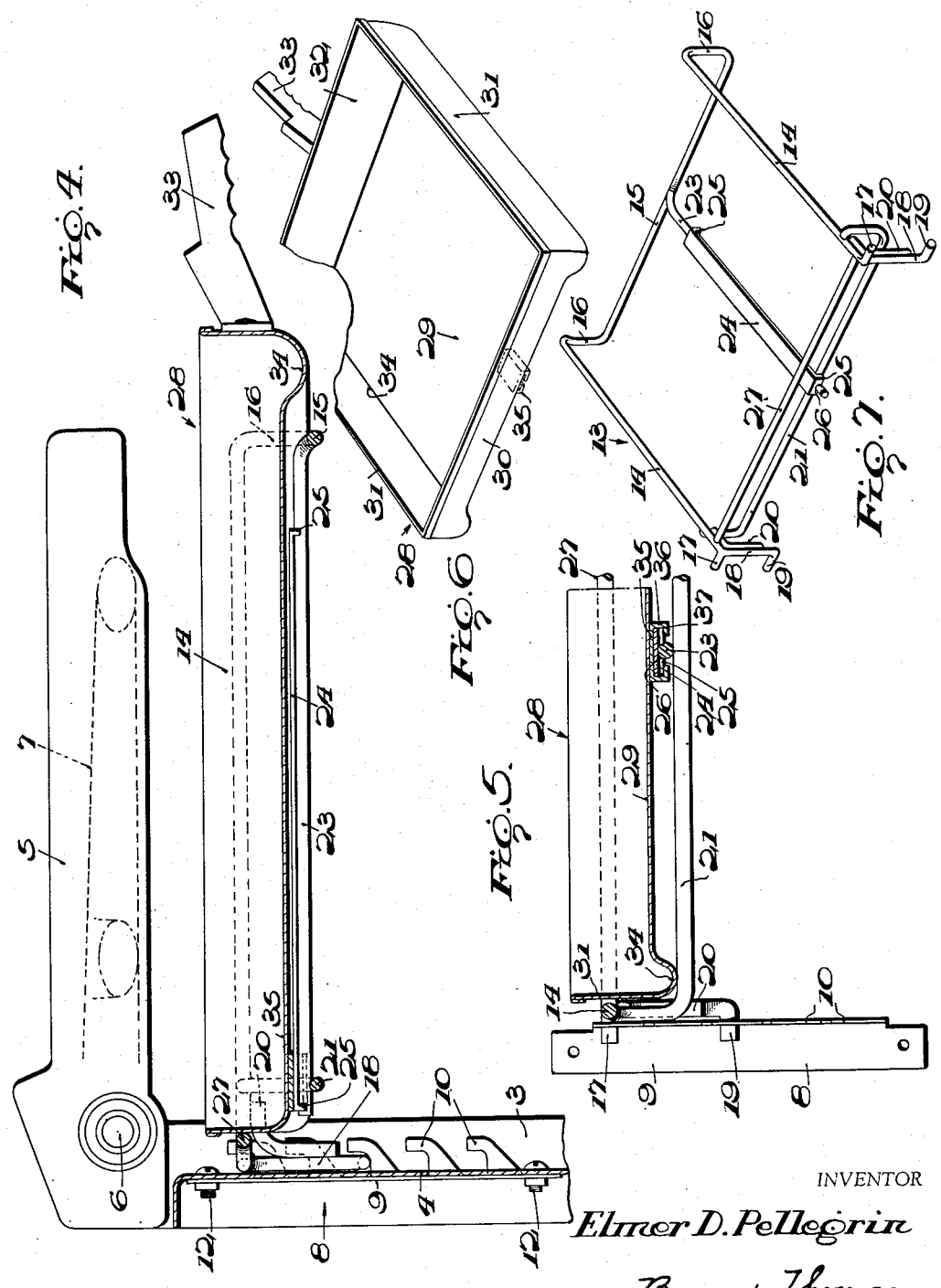

Patented July 6, 1954

2,682,831

UNITED STATES PATENT OFFICE 2,682,831

BROILER PAN AND ADJUSTABLE SUPPORT THEREFOR

Elmer D. Pellegrin, Woodstock, Ill., assignor to Dixie Foundry Company, Inc., Cleveland, Tenn., a corporation of Delaware Application July 7, 1952, Serial No. 297,493

3 Claims. (Cl. 99—425).

The present invention relates to an adjustable support and to a broiler pan adapted for use with such support.

The broiler pan support of this invention is described herein in connection with a broiler of the type disclosed in my co-pending patent application, Serial No. 277,037, filed March 17, 1952, but it is to be understood that the device is of general utility.

It is the primary object of the present invention to provide a support for a broiler pan which enables the pan to be readily adjusted to any desired distance from a heating element disposed thereabove.

It is another object of the invention to provide a support for a broiler pan upon which the pan may be easily slid forward and thereby withdrawn to permit inspection of the food product being broiled or, if desired, completely removed.

A further object of the invention is to provide a support for a broiler pan on which the pan is held against tilting, in a positive manner, for a wide range of travel in the direction of withdrawal of the pan from the support.

Yet another object of the invention is to provide a support for a broiler pan which can be formed of heavy gauge steel wire and, therefore, is very light in weight but of strong and rigid construction.

A still further object of the invention is to provide a support for a broiler pan which may be economically manufactured from inexpensive materials.

Other and further objects of the present invention will be apparent from the following detailed description taken in conjunction with the accompanying drawings, in which:

Fig. 1 is a side elevational view of the present device in position for use with the broiler pan in place;

Fig. 2 is a top plan view of the device, also with the broiler pan in place;

Fig. 3 is a fragmentary sectional view showing the broiler pan in a retracted position permitting inspection of its contents;

Fig. 4 is an enlarged fragmentary sectional view taken on the line 4—4 of Fig. 2 with certain parts shown in elevation;

Fig. 5 is an enlarged fragmentary sectional view taken on the line 5—5 of Fig. 2;

Fig. 6 is a perspective view of the broiler pan; and

Fig. 7 is a perspective view of the broiler pan support.

The numeral 1 generally denotes a stove top above which the instant broiler pan support is to be adjustably mounted and which is provided in the usual manner with a working surface 2 and a splash back panel 3. As is described in my earlier application, Serial No. 277,037, filed March 17, 1952, the splash back panel 3 is provided with a recessed portion 4 which provides a space to receive a broiler cover member 5 hingedly connected at 6 to the upper edge of the splash back panel 3. When the cover member 5 is swung downwardly the broiler is entirely concealed, but when raised so that it extends in a plane at right angles to the splash back panel 3 it is in position for use at a point near eye level. The broiler cover member 5 contains a heating element generally denoted by the numeral 7, Fig. 4, and as explained in my earlier application, the heating element may employ gas or electricity, as desired.

To the recessed portion 4 of the splash back there is secured, at laterally spaced points, a pair of hook bearing bracket members 8 for maintaining the broiler pan support in adjusted position in a manner to be fully described hereinafter. The bracket 8 may be integrally formed, as by stamping, and comprises a base portion 9 and a plurality of vertically spaced hook members 10 projecting at right angles from an edge of the base portion 9. The brackets 8 are preferably mounted on the recessed portion 4 of the splash back from the rearward side thereof by passing the hooks 10 through vertically elongated slots 11. The brackets 8 are rigidly secured in place by any suitable means such as, for example, bolts 12.

The broiler pan support, itself, is preferably formed of heavy gauge steel wire and comprises a wire member 13, which is U-shaped when viewed from above. The U-shaped member 13 includes a pair of side portions 14 which are substantially parallel and lie in a single horizontal plane. The base portion 15 of U-shaped member 13 is offset below the plane of the side portions 14 and is joined to the side portions 14 by connecting portions 16 which depend from the outer ends of the side portions 14 and are bowed slightly outwardly. As will be seen later, this arrangement provides an opening for the reception of the broiler pan. The inner ends of the side portions 14 are bent outwardly at right angles to form hook engaging members 17 lying in the same horizontal plane as the side portions 14.

To the inner ends of the side portions 14 there is secured, as by welding, a pair of depending legs 18 having hook engaging members 19 extending laterally outwardly therefrom so as to be disposed vertically below the hook engaging members 17. With the hook engaging members 17 inserted behind a selected pair of hooks 10, the hook engaging members 19 will engage a lower pair of the hooks 10 thus providing vertically spaced contact points, which will maintain the broiler support in horizontal parallelism with the heating element 7. The hook engaging members 17 and 19 are preferably spaced apart a distance equal to that between a first and third of the vertically spaced hook members 10 of the bracket 8 as this provides a more stable arrangement than would be obtained by the spacing represented by the distance between a hook member 10 and the next succeeding hook member.

Each of the depending legs 18 is provided with an L-shaped brace member 20 secured thereto and to the under side of the side portions 14, as by welding.

Between the side portions 14 at a point adjacent their inner ends is secured, as by welding, a transverse member 21 having a configuration and dimensions corresponding to that of base portion 15 and connecting portions 16 of U-shaped wire member 13.

A guide rail 23 is positioned parallel with the side portions 14 and secured adjacent one end to transverse member 21 and at its other end to the base portion 15 of the U-shaped member 13 by welding at points thereon located midway between side portions 14. The inner end of guide rail 23 projects slightly beyond the transverse member 21 and lies in a horizontal plane except for a portion adjacent its outer end, which curves downwardly until it meets the base portion 15 of U-shaped member 13, as is best shown in Fig. 4.

To the upper surface of guide rail 23 is secured, again as by welding, a metal contact or guide strip 24, which extends from a point slightly rearwardly of the transverse member 21 to a point adjacent to, but short of, the base portion 15. To aid in securing the contact strip 24 upon guide rail 23, the strip may be provided, at both ends thereof, with depending flanges 25 having arcuate recesses 26 formed therein to receive the guide rail 23.

In order to provide the present broiler pan support with greater rigidity a linear rod member 27 may be secured, preferably by welding, between the inner ends of the side portions 14 of the U-shaped member 13. This rod member 27 will also serve as a stop to be engaged by the end wall of the broiler pan.

It is to be understood that only one transverse member is required to interconnect the inner ends of the side portions 14 and that therefore one of the members 21 or 27 may be omitted. The omitting of member 21 would, of course, necessitate the bending upward of the inner end of guide rail 23 for securing it to rod 27.

The broiler pan is designated generally by the numeral 28 and is constructed in a particular manner for cooperation with the pan support described above. The broiler pan 28 is generally rectangular in shape and is provided with a flat bottom wall 29 providing a grill surface, a front wall 30, side walls 31, and a rear wall 32 to which is secured by any suitable means a handle 33. The portions of bottom wall 29 bordering side walls 31 and rear wall 32 are depressed below the plane of the bottom wall to form a U-shaped, internal grease-collecting channel 34. The legs of the channel 34 provide external ridges along the sides of the pan for sliding contact with the base portion 15 of U-shaped member 13. No channel is provided adjacent front wall 30 as the space below the grill surface must be unobstructed in this region in order to enable the front end of the pan 28 to pass over the guide means including rail 23 and contact strip 24.

On the outside of the bottom wall 29 there is secured, midway between side walls 31 and adjacent front wall 30, a metallic pad 35 which has sliding contact with the upper surface of metal contact strip 24 when the support and broiler pan are in assembled relation. At this time, the ridges along the sides of the broiler pan will make sliding line contact with the upper surface of base portion 15 of U-shaped wire member 13 so that the broiler pan may easily be moved under the heating element 7 or withdrawn for inspection.

In order to counteract the tendency of the broiler pan to tip during that portion of its movement of withdrawal in which it is overbalanced, the contact pad 35 is provided with depending legs 36 having inturned flanges 37 at their lower edges, which partially embrace the contact strip 24. It will be understood, of course, that the flanges 37 must be displaced from the lower surface of pad 35 a distance which will permit them to clear the front flange 25 of contact strip 24.

With the above description in mind, the manner of using the present device will be clear. With the broiler cover member 5 raised, the broiler support 13 will be affixed to the splash back a desired distance below heating element 7 by inserting the hook engaging members 17 and 19 behind the selected hooks 10. In the present instance, five hooks have been shown on each bracket 8 and it is readily seen that with the hook engaging means spaced to contact a first and third hook, three positions of the broiler support are possible.

With the broiler pan support 13 in place, it is a simple matter to position the broiler pan 28 thereon. The ridges along the sides of the pan will make sliding contact with the upper surface of base portion 15 of U-shaped wire member 13 and the pan will enter between the connecting portions 16 and the side portions 14. The unobstructed space below the grill surface 29 at the front portion of the pan will allow it to pass over the guide rail 23 and contact strip 24 and if the pan is centered and held substantially horizontal, the inturned flanges 37 of contact pad 35 will pass under the front flanges 25 of contact strip 24.

From this point on, the broiler pan 28 is maintained on the support 13 in a positive manner. The broiler pan 28 may be withdrawn for inspection of the contents and slid back into place without danger of falling even if the user removes his hands from the handle when the pan is almost in its fully retracted position.

It will be understood that various changes in the details of construction and arrangement of the support 13, brackets 8 and broiler pan 28 may be made without departing from the principles of the invention or the scope of the annexed claims.

What I claim is:

1. In combination, a pair of brackets mounted upon a supporting wall in laterally spaced relation, each of said brackets having vertically spaced hook members formed thereon and extending outwardly from said wall; a broiler pan support comprising a wire frame having laterally spaced pairs of vertically spaced laterally extending hook engaging members at one end thereof engaged with hook members of said brackets, said wire frame including a U-shaped member having horizontal side portions disposed in a common horizontal plane and a base portion remote from said hook engaging members disposed in a plane below that of said side members; guide means mounted upon said frame between said side portions; a broiler pan slidably engaging said base portion of said frame and disposed between said side portions; and means on said pan engaged with said guide means for guiding and additionally supporting said broiler pan during movement relative to said frame.

2. A support for a broiler pan adapted to be adjustably mounted on a pair of laterally spaced brackets provided with a series of vertically spaced outwardly extending parallel hook members, comprising: a U-shaped wire member having its side portions substantially parallel and lying in a single horizontal plane and its base portion offset below the plane of said side portions to provide for the reception of said pan between said side portions, the inner ends of said side portions being bent laterally outwardly to form laterally extending hook engaging members; legs secured to and depending from the inner ends of said side portions, said legs having laterally extending hook engaging members disposed below the hook engaging members of said side portions; a transverse linear rod member secured at its opposite ends to said side portions of said U-shaped wire member adjacent their inner ends, said rod member reinforcing said support and acting as a stop for a broiler pan positioned thereon; a second U-shaped wire member having its leg portions secured to and depending from said side portions of said first U-shaped member in a region adjacent their inner ends, said second U-shaped member having a base portion lying in substantially the same horizontal plane as the base portion of said first U-shaped member; and guide means for said broiler pan disposed intermediate said side portions of said first U-shaped member and having the ends thereof secured to said base portions of said first and second U-shaped members.

3. A broiler pan and support therefor, comprising: support structure including a U-shaped wire member having its side portions substantially parallel and lying in a single horizontal plane and its base portion offset below the plane of said side portions, the inner ends of said side portions being provided with laterally extending hook engaging members; legs depending vertically from the inner ends of said side portions, said legs having laterally extending hook engaging members disposed below the hook engaging members of said side portions; a transverse member interconnecting said side portions of said U-shaped wire member at a region adjacent the inner ends of said side portions; guide means disposed intermediate said side portions and having one end thereof connected with said base portion and its other end connected with said transverse member; a generally rectangular broiler pan having opposed front and rear walls, side walls, and a bottom wall providing a grill surface, said bottom wall including portions bordering said side walls depressed below the plane of said bottom wall and forming internal grease-collecting channels and external ridges in sliding contact with said offset base portion of said U-shaped wire member; and a contact pad secured to said bottom wall intermediate said ridges and adjacent said front wall in sliding contact with said guide means, said contact pad including means partially embracing said guide means to prevent tipping of said pan when so far withdrawn as to be overbalanced.

References Cited in the file of this patent

UNITED STATES PATENTS

| Number | Name | Date |
|---|---|---|
| 224,740 | Stafford | Feb. 17, 1880 |
| 1,135,704 | Loftin, et al. | Apr. 13, 1915 |
| 1,748,854 | Stockstrom | Feb. 25, 1930 |
| 1,786,045 | Vogt | Dec. 23, 1930 |
| 1,943,939 | Hoffstetter | Jan. 16, 1934 |
| 1,961,391 | Reedy et al. | June 5, 1934 |
| 2,057,780 | Kahn | Oct. 20, 1936 |
| 2,132,737 | Kahn | Oct. 11, 1938 |
| 2,161,912 | Cossin | June 13, 1939 |
| 2,262,302 | Sinclair | Nov. 11, 1941 |
| 2,430,848 | Schneider | Nov. 11, 1947 |

FOREIGN PATENTS

| Number | Country | Date |
|---|---|---|
| 6,503 | Great Britain | Apr. 7, 1900 |